United States Patent
Suh et al.

(10) Patent No.: US 7,599,144 B2
(45) Date of Patent: Oct. 6, 2009

(54) METHOD AND APPARATUS COMPENSATING DISTURBANCE IN STATE CONTROL DEVICE

(75) Inventors: Sang-min Suh, Seoul (KR); Sang-eun Baek, Incheon Metropolitan (KR); Jun-seok Shim, Seongnam-si (KR); Yong-kyu Byun, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 186 days.

(21) Appl. No.: 11/474,383

(22) Filed: Jun. 26, 2006

(65) Prior Publication Data
US 2006/0291087 A1 Dec. 28, 2006

(30) Foreign Application Priority Data
Jun. 27, 2005 (KR) ............... 10-2005-0055905

(51) Int. Cl.
*G11B 5/596* (2006.01)
(52) U.S. Cl. ................. 360/77.02; 360/77.07
(58) Field of Classification Search ............ None
See application file for complete search history.

(56) References Cited

U.S. PATENT DOCUMENTS

| | | | |
|---|---|---|---|
| 5,585,976 A | 12/1996 | Pham | |
| 6,411,461 B1* | 6/2002 | Szita | 360/77.07 |
| 2002/0109934 A1* | 8/2002 | Chew | 360/77.04 |
| 2006/0176605 A1* | 8/2006 | Baek et al. | 360/77.04 |
| 2007/0064334 A1* | 3/2007 | Jia et al. | 360/77.02 |

FOREIGN PATENT DOCUMENTS

| | | |
|---|---|---|
| JP | 2002093084 | 3/2002 |
| KR | 2001-0113648 | 12/2001 |
| KR | 1020040097944 | 11/2004 |

* cited by examiner

*Primary Examiner*—Andrew L Sniezek
(74) *Attorney, Agent, or Firm*—Volentine & Whitt, PLLC

(57) ABSTRACT

A method and system are disclosed for compensating disturbance applied to a plant, such as a HDD component, controlled by a state control device having an estimator & controller. The estimator & controller is adapted to generate a first control signal in response to a state signal indicating an estimated state of the plant. A second control signal is generated by applying a transfer function H(s) having defined gain/frequency characteristics to a control signal derived from the first control signal. An overall control signal is generated in response to the second control signal and the control signal derived from the first control signal and applied to the plant.

19 Claims, 5 Drawing Sheets

METHOD AND APPARATUS COMPENSATING DISTURBANCE IN STATE CONTROL DEVICE

BACKGROUND OF THE INVENTION

1. Field of the Invention

Embodiments of the invention relate generally to a method and apparatus compensating disturbance in a state control device. More particularly, embodiments of the invention relate to a method and apparatus reducing the effect of disturbance applied to a head driving unit in a track following control device of a hard disk drive (HDD).

This application claims the benefit of Korean Patent Application No. 10-2005-0055905, filed on Jun. 27, 2005, the subject matter of which is hereby incorporated by reference.

2. Description of the Related Art

A track following control device within a hard disk drive (HDD) is commonly adapted to locate (or position) a read or read/write head on the center of a target track. Disturbance (e.g., mechanical shock or vibration) applied to a driving unit associated with the head may cause a track following error. Accordingly, it is necessary to effectively eliminate or remedy such disturbance.

Figure 1:
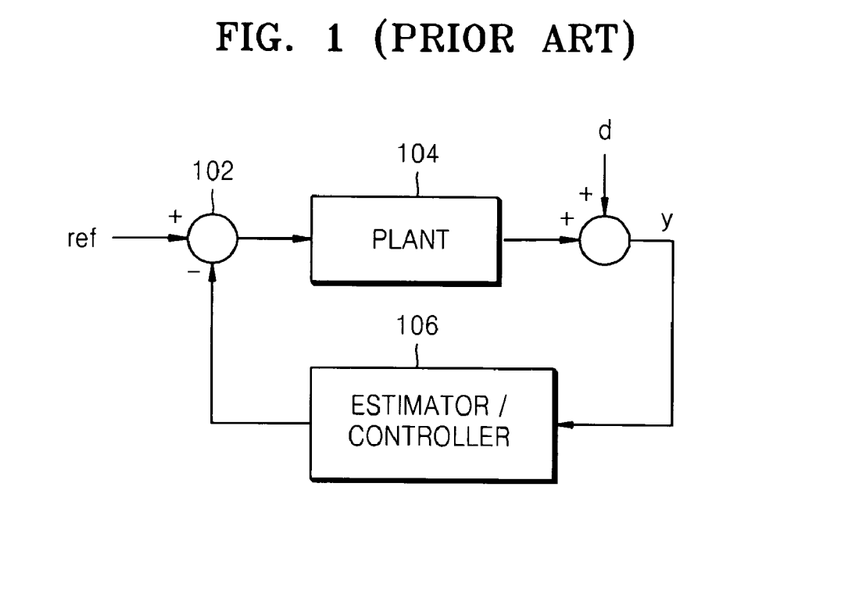
FIG. 1 is a block diagram of an exemplary track following control device as implemented in a conventional HDD.

Figure (FIG.) 1 is a block diagram of an exemplary track following control device as implemented in a conventional HDD. Referring to FIG. 1, the track following control device is a type of state control device including a plant 104 and an estimator & controller 106. The estimator & controller 106 is adapted to estimate a current state for plant 104 and control the state of plant 104 based on the estimated state.

Plant 104 corresponds in the illustrated example to a head driving unit within the HDD. An output of plant 104 may include servo samples associated with the head, (i.e., position information associated with the head).

The estimated state provided by estimator & controller 106 includes position information related to the head driving unit, position and speed information related to the head, and corresponding servo samples associated with the head. Based on the estimated state information, estimator & controller 106 generates a reference control signal adapted to maintain (or achieve) a defined state indicated by a reference signal.

In FIG. 1, disturbance signal "d" indicates the nature of disturbance to be compensated (e.g., amplitude and duration of the disturbance), and state signal "y" indicates a current state (e.g., position) of a controlled object, such as a head and/or head driving unit in the illustrated example.

Disturbance signal "d" may be frequency related. In such circumstances, it is particularly important to eliminate low frequency disturbance, (i.e., disturbances having a frequency less than a defined crossover frequency for plant 104).

A gain value associated with estimator & controller 106 may be controlled (e.g., increased or decreased) to effectively compensate for the disturbance indicated by disturbance signal "d". As the gain of estimator & controller 106 increases, the compensation effect on low frequency disturbances may improve, but the effect of high frequency disturbance, (i.e., disturbances having a frequency greater than the crossover frequency of the plant 104) may actually suffer.

Figure 2:
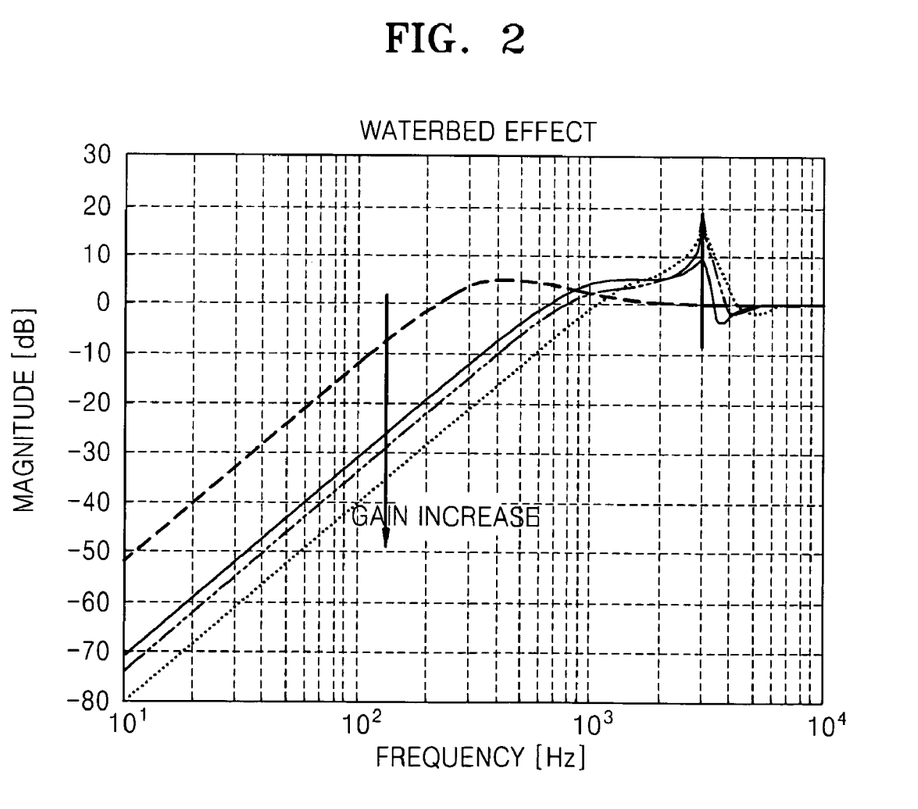
FIG. 2 is a graph illustrating a relationship between the gain of estimator & controller and gain/frequency characteristics of an exemplary track following control device, like the one shown in FIG. 1.

FIG. 2 is a graph illustrating a relationship between the gain of estimator & controller 106 and gain/frequency characteristics of an exemplary track following control device, like the one shown in FIG. 1. Relationships between gain and gain/frequency characteristics for four separate cases are shown in FIG. 2. Referring to FIG. 2, as the gain of estimator & controller 106 increases, a crossover frequency shifts to a higher value on the gain/frequency characteristic curve. Also, as the gain of estimator & controller 106 increases, gain in a frequency range less than the crossover frequency decreases, while gain in a frequency range greater than the crossover frequency increases. These results are referred to as the "waterbed effect".

Referring still to FIG. 2, an ideal disturbance compensation outcome would be: (1) low frequency disturbances would be eliminated, (2) any shift of a crossover frequency would be modest, and (3) high frequency disturbances would not be increased.

SUMMARY OF THE INVENTION

Embodiments of the invention provide a method and apparatus better compensating disturbance applied to a plant in a state control device. In one specific embodiment, the invention provides a method of compensating disturbance applied to a head driving unit operating in a track following mode within a hard disk drive (HDD). Thus, an embodiment of the invention provides a track following control device adapted to compensate disturbance applied to a head driving unit in a HDD. In another embodiment, the invention provides a hard disk drive capable of effectively compensating for disturbance applied to a head driving unit. In yet another embodiment, the invention also provides a computer-readable recording medium having embodied thereon a program adapted to implement the above methods.

In one embodiment, the invention provides a method of compensating disturbance applied to a plant controlled by a state control device having an estimator & controller, the estimator & controller generating a first control signal in response to a state signal indicating an estimated state of the plant, the method comprising; generating a second control signal by applying a transfer function H(s) having defined gain/frequency characteristics to a control signal derived from the first control signal, and generating an overall control signal in response to the second control signal and the control signal derived from the first control signal and applying the overall control signal to the plant.

In another embodiment, the invention provides a state control device adapted to the control of a plant, the plant receiving a disturbance, and the state control device comprising; an estimator & controller adapted to generate a first control signal in response to a state signal indicative of an estimated state of the plant, a first adder adapted to add a reference signal to the first control signal, a transfer function shaping controller adapted to generate a second control signal by applying a transfer function H(s) to an output of the first adder, and a second adder adapted to add the second control signal and the output of the first adder and generate an overall control signal provided to the plant.

In another embodiment, the invention provides a track following control device comprising; a head driving unit, an estimator & controller adapted to generate a first control signal in response to a state signal indicating an estimating state for the head driving unit based, at least in part, on servo samples associated with a head of the dead driving unit, a transfer function shaping controller adapted to generate a second control signal by applying a transfer function H(s) to a control signal derived from the first control signal, and an adder adapted to provide the head driving unit with an overall control signal generated from the second control signal and the control signal derived from the first control signal.

In another embodiment, the invention provides a hard disk drive (HDD) unit comprising; a disk adapted to store information, a spindle motor adapted to rotate the disk, a head adapted to write information on the disk and reading information from the disk, a voice coil motor (VCM) driver adapted to drive a VCM, the VCM adapted to move the head across a surface of the disk, and a controller for adapted to control the VCM driver, the controller comprising an estimator & controller adapted to generate a first control signal in response to a state signal associated with the VCM driver, wherein the controller is further adapted to control the VCM driver by generating a second control signal by applying a transfer function H(s) having defined gain/frequency characteristics to a control signal derived from the first control signal.

In a related aspect to each of the foregoing embodiments, the transfer function H(s) may be given by $$H(s) = K_p + K_1 \frac{1}{s/\omega_1 + 1} + K_2 \frac{\omega_2^2}{s^2 + 2\varsigma_2 \omega_2 s + \omega_2^2}$$

where Kp, K1 and K2 are gain constants, ω1 and ω2 are cutoff frequencies, and ζ2 is a factor defining behavior of a peak response in the defined gain/frequency characteristics.

DESCRIPTION OF EMBODIMENTS

The invention will now be described in the context of several embodiments with reference to the accompanying drawings.

Figure 3:
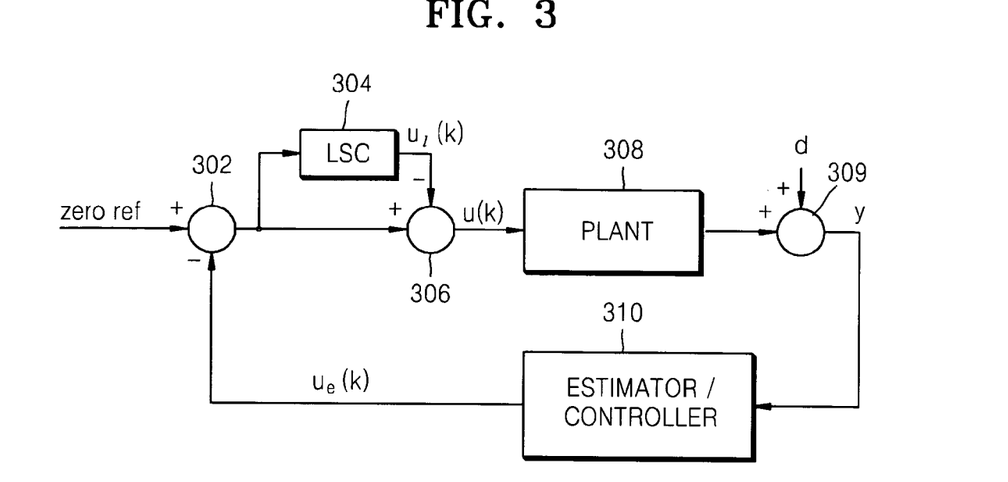
FIG. 3 is a block diagram of an exemplary track following control device adapted for use in a hard disk drive (HDD) and implemented in accordance with an embodiment of the invention.

FIG. 3 is a block diagram of an exemplary track following control device adapted for use in a hard disk drive (HDD) and implemented in accordance with an embodiment of the invention.

Referring to FIG. 3, the track following control device comprises a first adder 302 adapted to add a reference signal (ref) and a first control signal ue(k). (In one related aspect of the illustrated embodiment, the reference signal (ref) is a zero (0) reference signal adapted for use in the track following control device). The track following control device further comprises an open loop transfer function shaping controller 304 adapted to generate a second control signal ul(k) and a second adder 306 adapted to add the output of first adder 302 and second control signal ul(k) and output an overall control signal u(k) to a plant 308. An estimator & controller 310 is adapted to calculate and generate first control signal ue(k) corresponding to an output of plant 308 and disturbance. A third adder 309 is provided and is adapted to add an output signal from plant 308 and a disturbance signal "d" to generate a state signal "y". State signal "y" is then feedback to estimator & controller 310 and used to generate the first control signal.

The track following control device of FIG. 3 is different in one aspect from the conventional track following control device of FIG. 1 in that it further comprises transfer function shaping controller 304 which is adapted to shape the output of first adder 302 in relation to a defined transfer function H(s). The transfer function H(s) implemented by transfer function shaping controller 304 may in one embodiment be given as:

$$H(s) = K_p + K_1 \frac{1}{s/\omega_1 + 1} + K_2 \frac{\omega_2^2}{s^2 + 2\varsigma_2 \omega_2 s + \omega_2^2} \quad (1)$$

where $K_p$ is a gain constant for disturbance compensation, $$K_1 \frac{1}{s/\omega_1 + 1}$$

is a factor including a gain constant K1 adapted to reduce low frequency disturbances by −20 dB/decade, and $$K_2 \frac{\omega_2^2}{s^2 + 2\varsigma_2 \omega_2 s + \omega_2^2}$$

is a factor including gain constant K2 adapted to further reduce low frequency disturbances by −40 dB/decade.

Also, in Equation 1, ω1 and ω2 are cutoff frequencies of −20 dB/decade and −40 dB/decade, respectively, both of which are less than a defined crossover frequency, and ζ2 determines the behavior of a peak in eliminating low frequency disturbance. ω1, ω2, and ζ may be determined in relation to frequency, gain characteristics, etc. for the particular device to be controlled.

A state variable adapted for use within the foregoing context may in one embodiment be given, as $$\hat{x}(k) = \bar{x}(k) + L_e(y(k) - C_e \bar{x}(k))$$

$$\bar{x}(k+1) = A_e \hat{x}(k) + B_e u_e(k) \quad (2)$$

This state variable is conventionally understood. (See, for example, Franklin, Gene F., J. David Powell and Michael L. Workman, Digital Control of Dynamic systems, Second edition. Addison-Wesley. Menlo Park, Calif. (1990)).

Equation 1 may thus be expressed using the state variable as follows.

$$w(k+1) = A_l w(k) + B_l y(k)$$

$$u_l(k) = C_l w(k) + D_l y(k) \quad (3)$$

The first control signal using the state variable may be given by $u_e(k) = -K\hat{x}(k)$, and the overall control signal may be given by, $$u(k) = -u_e(k) - u_l(k) \quad (4)$$

From Equations 2 and 4, the state variable of the estimator may be given by, $$\bar{x}(k+1) = A_e\hat{x}(k) + B_e u_e(k) \quad (5)$$
$$= A_e\hat{x}(k) - B_e K\hat{x}(k)$$
$$= (A_e - B_e K)((I - LC_e)\bar{x}(k) + L_e y(k))$$
$$= (A_e - B_e K)((I - LC_e)\bar{x}(k) + (A_e - B_e K)L_e y(k)$$

From using Equations 3 and 4, the overall control signal applied to plant 308 may be given by, $$u(k) = -K\hat{x}(k) - u_1(k) \quad (6)$$
$$= -K(\bar{x}(k) + L_e(y(k) - C_e\bar{x}(k))) - C_1 w(k) - D_1 y(k)$$
$$= -K(I - L_e C_e)\bar{x}(k) - C_1 w(k) - (D_1 + KL_e)y(k)$$

From Equations 3, 5, and 6, the state variable for the track following control device of FIG. 3 may be expressed as follows.

$$\begin{bmatrix} \bar{x}(k+1) \\ w(k+1) \end{bmatrix} = \begin{bmatrix} (A_e - B_e K)(I - L_e C_e) & 0 \\ 0 & A_1 \end{bmatrix} \quad (7)$$
$$\begin{bmatrix} \bar{x}(k) \\ w(k) \end{bmatrix} + \begin{bmatrix} (A - B_e K)L_e \\ B_1 \end{bmatrix} y(k)$$
$$u(k) = [-K(I - L_e C_e) - C_1]\begin{bmatrix} \bar{x}(k) \\ w(k) \end{bmatrix} - (D_1 + KL_e)y(k)$$

Figure 4:
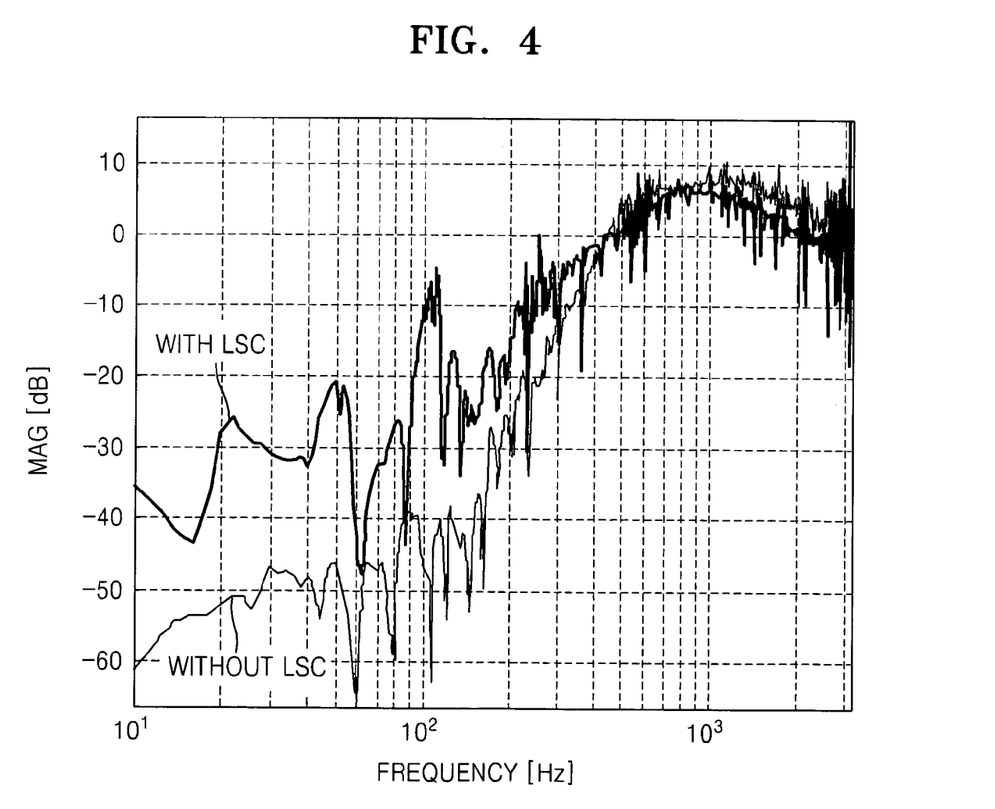
FIG. 4 is a graph illustrating frequency/gain characteristics of the track following control device of FIG. 3.

FIG. 4 is a graph illustrating frequency/gain characteristics of the track following control device of FIG. 3. The upper line of the graph shown in FIG. 4 represents the frequency/gain characteristics when transfer function shaping controller 304 is not used, and a lower line in the graph of FIG. 4 represents the frequency/gain characteristics when transfer function shaping controller 304 is used.

Referring to FIG. 4, gain decreases in a frequency range less than the crossover frequency, a shift in the crossover frequency is modest, and gain in a frequency range greater than the crossover frequency increases slightly. In particular, a peak hardly increases, thereby achieving very satisfactory gain/frequency characteristics. Further, as may be seen, transfer function shaping controller 304 may be used to effectively reduce low frequency disturbances.

Figure 5:
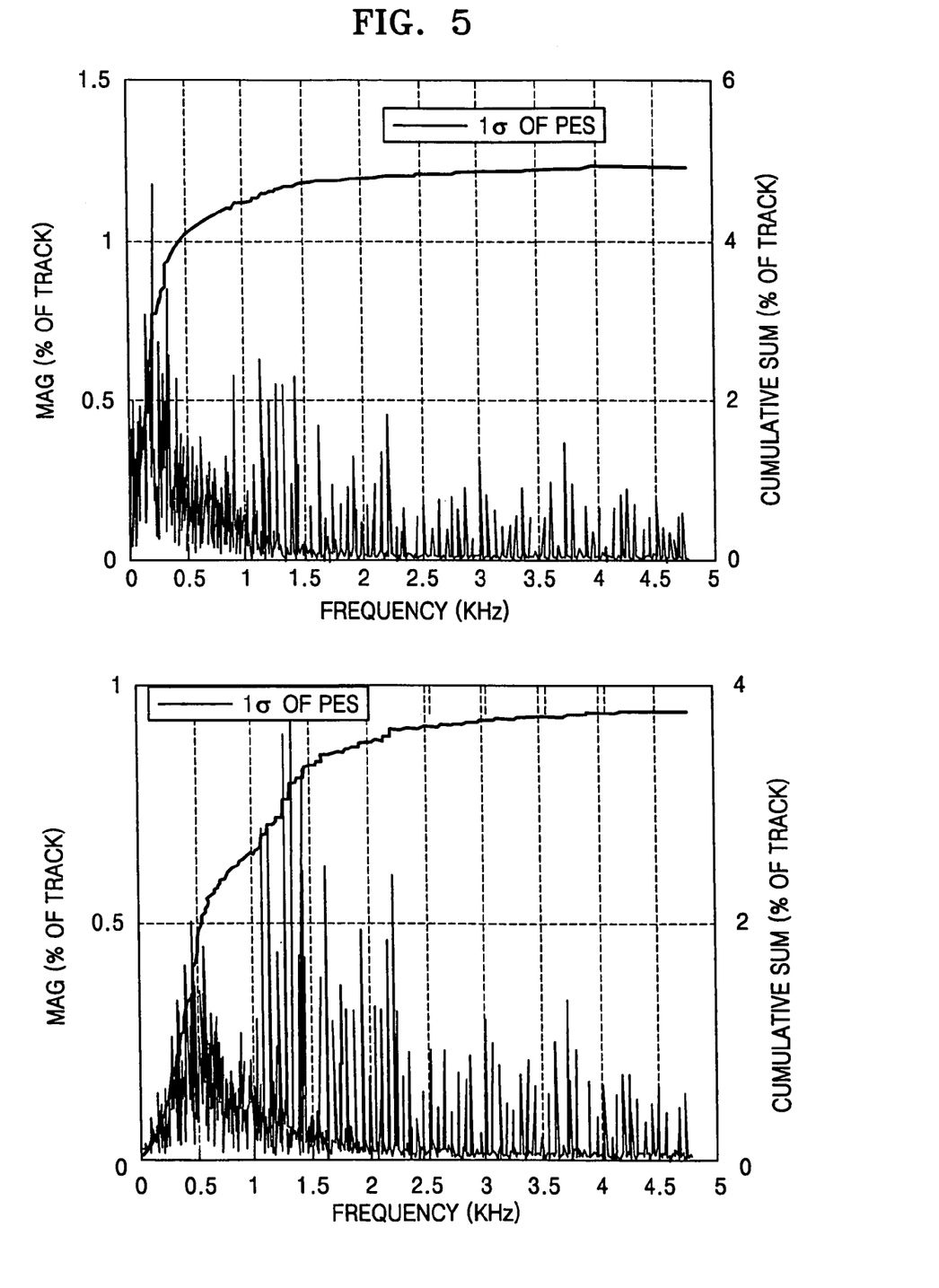
FIG. 5 contains graphs illustrating run-out characteristics of a position error signal (PES) of the track following control device of FIG. 3 according to an embodiment of the present invention.

FIG. 5 contains related graphs illustrating run-out characteristics for a position error signal (PES) of the track following control device of FIG. 3. The upper graph of FIG. 5 illustrates the run-out characteristics when transfer function shaping controller 304 is not used while the lower graph of FIG. 5 illustrates the run-out characteristics when transfer functions shaping controller 304 is used. FIG. 5 illustrates both repeatable run-output (RRO) characteristics and non-repeatable run-out (NRRO) characteristics.

Referring to FIG. 5, when transfer function shaping controller 304 is used, a deviation σ in the entire frequency range decreases greatly, and particularly, a deviation σ of the PES in a range less than 500 Hz decreases remarkably. It can be seen from FIG. 5 that transfer function shaping controller 304 enables a head to more stably follow a track.

Figure 6:
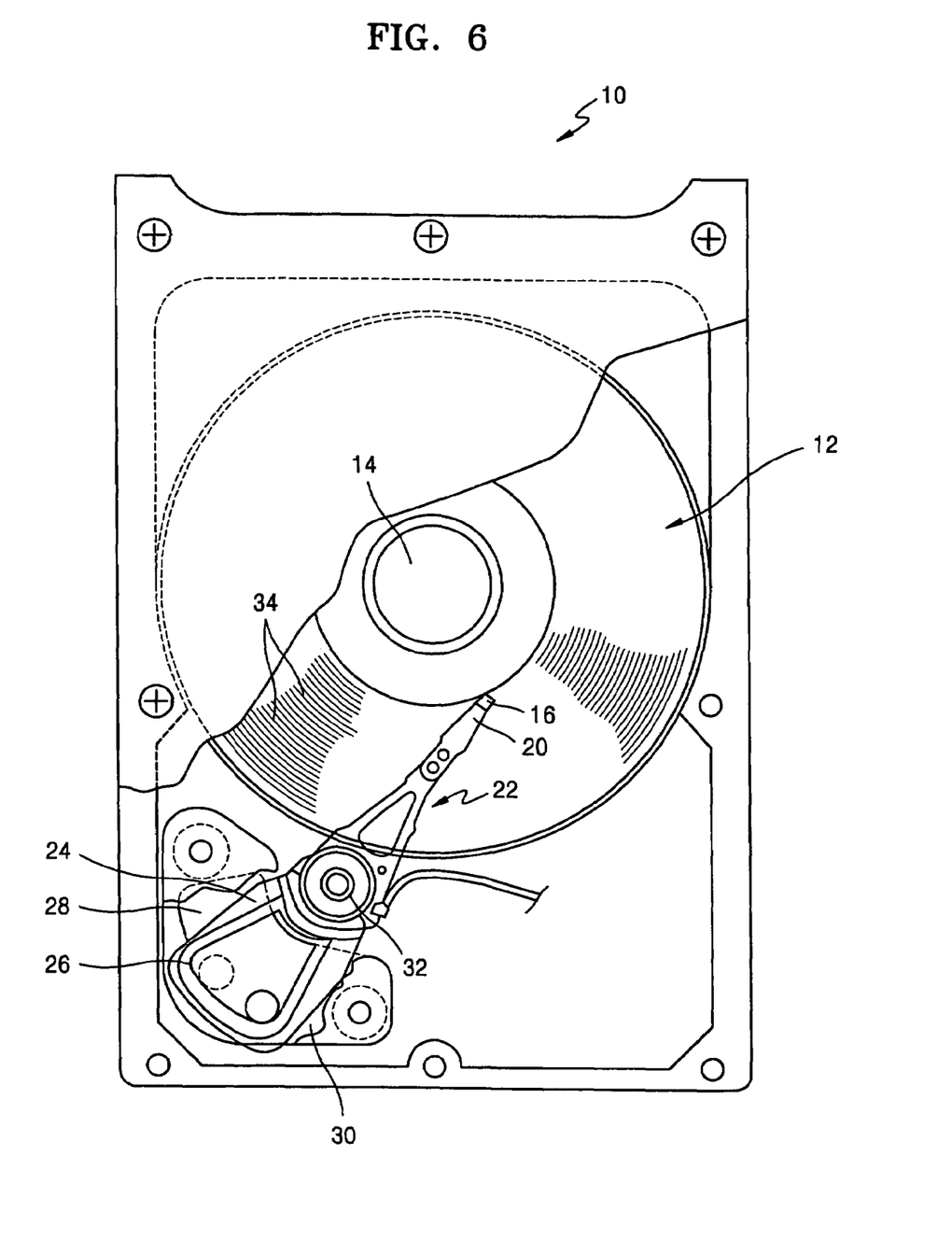
FIG. 6 illustrates a structure of a head/disk assembly (HDA) of an HDD according to an embodiment of the present invention.

FIG. 6 is a plan view of a head/disk assembly (HDA) 10 of an HDD according to an embodiment of the invention.

Referring to FIG. 6, the HDA 10 comprises at least one disk 12 rotating on a spindle motor 14, and a head 16 positioned proximate the surface of disk 12.

Head 16 can read/write information from/to rotating disk 12 by detecting a magnetic field associated with disk 12 or magnetizing the disk 12, respectively. Typically, a separate head 16 is associated with a surface of each disk 12. Although a single head is shown, it should be understood, however, that head 16 may include a write head adapted to magnetize disk 12 and a read head adapted to detecting a magnetic field associated with disk 12. The read head may be made of a magneto-resistive (MR) material.

Head 16 may be integrated to a slider 20. Slider 20 is formed so that an air bearing is formed between head 16 and the surface of disk 12. Slider 20 is incorporated into a head stack assembly (HSA) 22. Head stack assembly HSA 22 is attached to an actuator arm 24 having a voice coil 26. Voice coil 26 is adjacent to a magnetic assembly 28 to define a voice coil motor (VCM) 30. When current is supplied to voice coil 26, VCM 30 generates a torque for rotating actuator arm 24 around a bearing assembly 32. Rotation of actuator arm 24 moves head 16 across the disk surface.

Information is generally recorded on a plurality of circular tracks 34 on disk 12. Each of tracks 34 comprises a plurality of sectors, and each of the sectors comprises a plurality of servo fields and data fields.

Figure 7:
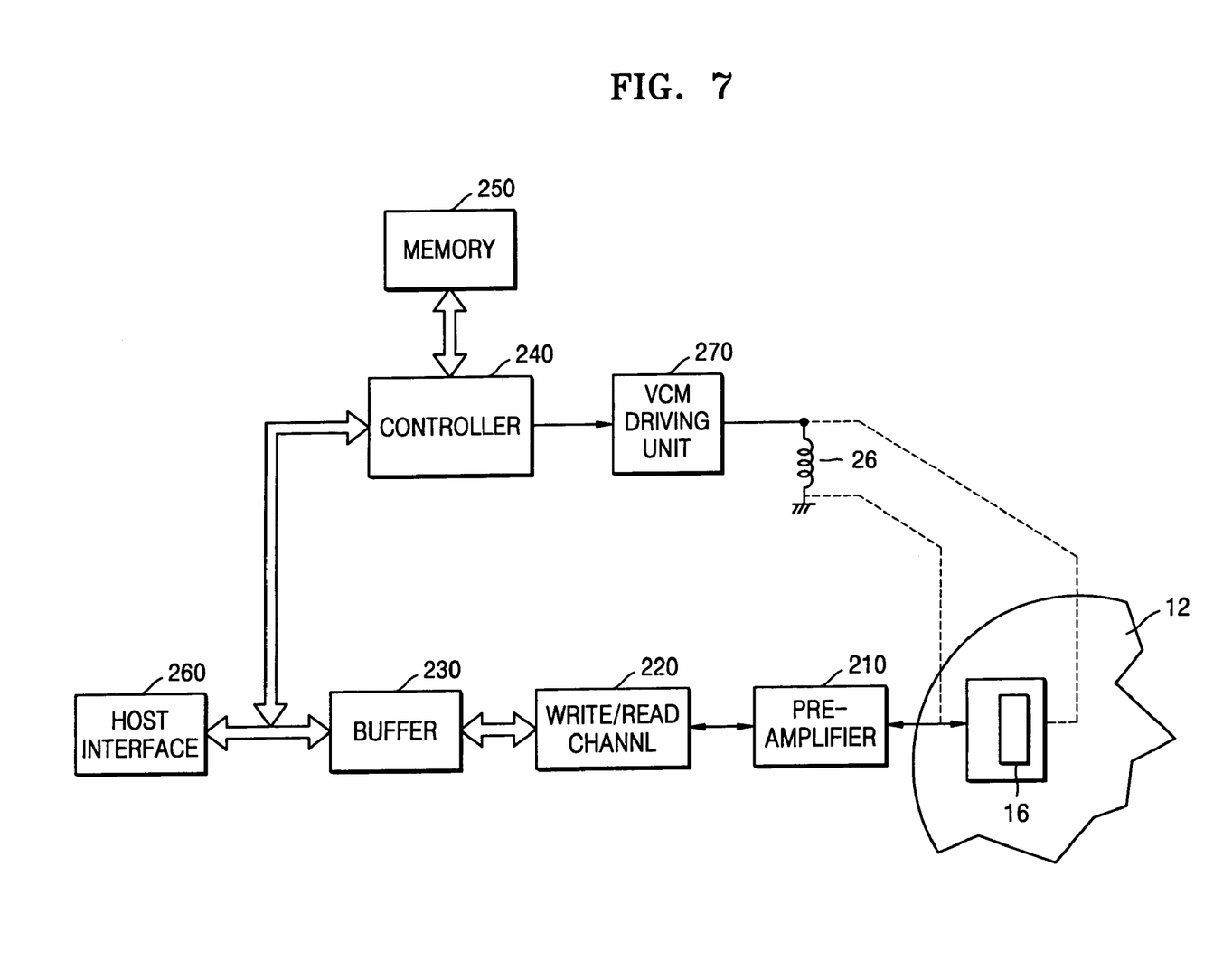
FIG. 7 is a block diagram of an HDD with electric circuits according to an embodiment of the present invention.

FIG. 7 is a block diagram of an electric circuit adapted for use in an HDD according to an embodiment of the invention.

Referring to FIG. 7, the HDD comprises disk 12, head 16, a pre-amplifier 210, a write/read channel 220, a buffer 230, a controller 240, a memory 250, and a host interface 260.

A circuit block comprising pre-amplifier 210 and write/read channel 220 is collectively referred to as a write/read circuit.

A software program adapted to control operation of the HDD may be stored in memory 250. Memory 250 may be non-volatile flash memory. In particular, when the track following control device of FIG. 3 is controlled by software in a track following mode, a program for the track following control device is stored in memory 250.

In a read mode, pre-amplifier 210 amplifies an analog signal detected by head 16 from disk 12 to generate a corresponding analog signal. Thereafter, write/read channel 220 converts the amplified analog signal into a digital signal readable by a host device (not shown). The digital signal is converted into stream data. Buffer 230 temporarily stores the stream data and transmits it to the host device via host interface 260.

In a write mode, buffer 230 temporarily stores data received through host interface 260 from the host device, and sequentially outputs the stored data to write/read channel 220. Write/read channel 220 converts the data into a binary data stream. Thereafter, head 16 uses a write current amplified by pre-amplifier 210 to write data on disk 12.

Controller 240 is adapted to control the circuits shown in FIG. 7 according to a command received through host interface 260 from the host device.

When receiving a read command from the host device, controller 240 controls head 16 to follow a target track and reads data written on disk 12. When receiving a read command from the host device, controller 240 controls head 16 to follow a target track and reads data on disk 12. When receiving a write command from the host device, controller 240 controls head 16 to follow a target track and writes data on disk 12.

A track following control method according to an embodiment of the present invention will now be explained in some additional detail.

In a track following mode, controller 240 controls head 16 to follow a target track with a target amount of off-track, by means of the rack following control device illustrated in FIG. 3. Because head 16 does not move to another track but the target track, a reference signal ref is zero (0). During the track following operation, the state (e.g., position and speed) of head 16 is estimated (e.g.,) through servo samples, (i.e., servo bursts) associated with head 16, and the movement of head 16 may be controlled based on the estimated state information.

The present invention may be embodied by a method, an apparatus, a system, and so on. If embodied in software, constituent elements of the present invention are code segments adapted to perform essential operations. Programs or code segments may be stored in processor-readable media. The processor-readable media includes any media that can store information. Examples of the processor-readable media are electronic circuits, semiconductor memory devices, read-only memories (ROMs), erasable ROMs, floppy disks, optical disks, and hard disks.

As described above, a method of compensating disturbance according to embodiments of the invention reduce gain in a frequency range less than a crossover frequency, achieve a modest shift in crossover frequency, and barely increase a peak in a frequency range greater than the crossover frequency, thereby effectively compensating disturbance.

While the present invention has been particularly shown and described with reference to embodiments thereof, it will be understood by those of ordinary skill in the art that various changes in form and details may be made therein without departing from the scope of the present invention as defined by the following claims.

What is claimed is:

1. A track following control device of compensating a disturbance applied to a plant controlled by a state control device having an estimator & controller, the estimator & controller generating a first control signal in response to a state signal indicating an estimated state of the plant in a track following mode, the method comprising:
    generating a second control signal in a transfer function shaping controller by applying a transfer function H(s) having defined gain/frequency characteristics to a control signal derived from the first control signal, wherein application of the transfer function H(s) reduces low frequency components in the disturbance having a frequency less than a cross-over frequency defined in frequency response characteristics of the plant;
    generating an overall control signal in response to the second control signal and the control signal derived from the first control signal; and
    applying the overall control signal to the plant.

2. The method of claim 1, wherein the transfer function H(s) is given by $$H(s) = K_p + K_1 \frac{1}{s/\omega_1 + 1} + K_2 \frac{\omega_2^2}{s^2 + 2\zeta_2\omega_2 s + \omega_2^2}$$

where Kp, K1 and K2 are gain constants, ω1 and ω2 are cutoff frequencies, and ζ2 is a factor defining behavior of a peak response in the defined gain/frequency characteristics.

3. The method of claim 1, wherein the control signal derived from the first control signal is generated by adding a reference signal to the first control signal.

4. The method of claim 3, wherein the reference signal is zero (0).

5. The method of claim 3, wherein the overall control signal is generated by adding the control signal derived from the first control signal to the second control signal.

6. The method of claim 1, wherein application of the transfer function H(s) does not increase a peak in high frequency components of the disturbance.

7. A state control device adapted to the control of a plant, the plant receiving a disturbance, and the state control device comprising:
    a track following controller including an estimator & controller adapted to generate a first control signal in response to a state signal indicative an estimated state of the plant in a track following mode;
    a first adder adapted to add a reference signal to the first control signal;
    a transfer function shaping controller adapted to generate a second control signal by applying a transfer function H(s) to an output of the first adder to reduce low frequency components of the disturbance having a frequency less than a cross-over frequency defined in frequency response characteristics of the plant; and
    a second adder adapted to add the second control signal and the output of the first adder and generate an overall control signal provided to the plant.

8. The state control device of claim 7, wherein the transfer function H(s) is given by $$H(s) = K_p + K_1 \frac{1}{s/\omega_1 + 1} + K_2 \frac{\omega_2^2}{s^2 + 2\zeta_2\omega_2 s + \omega_2^2}$$

where Kp, K1 and K2 are gain constants, ω1 and ω2 are cutoff frequencies, and ζ2 is a factor determining behavior of a peak response in the gain/frequency characteristics.

9. The state control device of claim 7, wherein the output of the first adder is generated by adding a reference signal to the first control signal.

10. The state control device of claim 7, further comprising:
    a third adder adapted to add an output signal from the plant and a disturbance signal indicative of the disturbance to generate the state signal.

11. The state control device of claim 7, wherein the plant comprises a head driving unit in a track following control device adapted for use in a hard disk drive, and wherein the estimated state is derived in relation to one or more servo samples associated with a head of the head driving unit.

12. A track following control device comprising:
    a head driving unit;
    a track following controller including an estimator & controller adapted to generate a first control signal in a track following mode and in response to a state signal indicating an estimating state for the head driving unit based, at least in part, on servo samples associated with a head of the head driving unit;
    a transfer function shaping controller adapted to generate a second control signal by applying a transfer function H(s) to a control signal derived from the first control signal to reduce low frequency components of the disturbance having a frequency less than a cross-over frequency defined in frequency response characteristics of the plant; and an adder adapted to provide the head driving unit with an overall control signal generated from the second control signal and the control signal derived from the first control signal.

13. The track following control device of claim 12, wherein the transfer function H(s) is given by $$H(s) = K_p + K_1 \frac{1}{s/\omega_1 + 1} + K_2 \frac{\omega_2^2}{s^2 + 2\zeta_2\omega_2 s + \omega_2^2}$$

where Kp, K1 and K2 are gain constants, $\omega_1$ and $\omega_2$ are cutoff frequencies, and $\zeta_2$ is a factor determining behavior of a peak response for the gain/frequency characteristics.

14. The method of claim 12, wherein application of the transfer function H(s) does not increase a peak in high frequency components of the disturbance.

15. A hard disk drive (HDD) unit comprising:
   a disk adapted to store information;
   a spindle motor adapted to rotate the disk;
   a head adapted to write information on the disk and reading information from the disk;
   a voice coil motor (VCM) driver adapted to drive a VCM, the VCM adapted to move the head across a surface of the disk; and
   a controller for adapted to control the VCM driver, the controller comprising a track following controller including an estimator & controller adapted to generate a first control signal in a track following mode and in response to a state signal associated with the VCM driver, and a transfer function shaping controller;
   wherein the controller is further adapted to control the VCM driver by generating a second control signal in the transfer function shaping controller by applying a transfer function H(s) having defined gain/frequency characteristics to a control signal derived from the first control signal, wherein application of the transfer function H(s) reduces low frequency components of the disturbance having a frequency less than a cross-over frequency defined in frequency response characteristics of the plant.

16. The hard disk drive of claim 15, wherein the transfer function H(s) is given by $$H(s) = K_p + K_1 \frac{1}{s/\omega_1 + 1} + K_2 \frac{\omega_2^2}{s^2 + 2\zeta_2\omega_2 s + \omega_2^2}$$

where Kp, K1 and K2 are gain constants, $\omega_1$ and $\omega_2$ are cutoff frequencies, and $\zeta_2$ is a factor determine behavior of a peak response for the gain/frequency characteristics.

17. A processor-readable recording medium having embodied thereon program code defining a method of compensating disturbance applied to a plant controlled by a state control device comprising a track following controller and a transfer function shaping controller, wherein the track following controller includes an estimator & controller that generates a first control signal in response to a state signal indicating an estimated state for the plant in a track following mode, the method comprising:
   generating a second control signal in the transfer function shaping controller by applying a transfer function H(s) having defined gain/frequency characteristics to a control signal derived from the first control signal to reduce low frequency components of the disturbance having a frequency less than a cross-over frequency defined in frequency characteristics of the plant; and
   generating an overall control signal by adding the second control signal to the control signal derived from the first control signal and applying the overall control signal to the plant.

18. The processor-readable computer readable recording medium of claim 17, wherein the transfer function H(s) is given by $$H(s) = K_p + K_1 \frac{1}{s/\omega_1 + 1} + K_2 \frac{\omega_2^2}{s^2 + 2\zeta_2\omega_2 s + \omega_2^2}$$

where Kp, K1 and K2 are gain constants, $\omega_1$ and $\omega_2$ are cutoff frequencies, and $\zeta_2$ is a factor determine behavior of a peak response in the gain/frequency characteristics.

19. The processor-readable recording medium of claim 18, wherein the plant comprises a head driving unit controlled by a track following control device and the first control signal is derived at least in part from servo samples associated with a head of the hard disk drive.

* * * * *